United States Patent [19]
Denissen et al.

[11] Patent Number: 5,450,400
[45] Date of Patent: Sep. 12, 1995

[54] TRAFFIC GENERATOR

[75] Inventors: Frank L. Denissen, Boom, Belgium; Jan Van Tetering, Zevenbergen, Netherlands

[73] Assignee: Alcatel N.V., Amsterdam, Netherlands

[21] Appl. No.: 234,275

[22] Filed: Apr. 28, 1994

[30] Foreign Application Priority Data

Apr. 29, 1993 [EP] European Pat. Off. ............ 93201236

[51] Int. Cl.$^6$ ............................................. H04L 12/54
[52] U.S. Cl. ......................................... 370/61; 370/102
[58] Field of Search ....................... 370/94.1, 94.2, 60, 370/84, 13, 16, 604, 58.1–58.3, 100.1, 102, 61

[56] References Cited

U.S. PATENT DOCUMENTS

| | | | |
|---|---|---|---|
| 5,132,964 | 7/1992 | Esaki | 370/60 |
| 5,132,966 | 7/1992 | Hayano et al. | 370/94.1 |
| 5,140,584 | 8/1992 | Suzuki | 370/94.1 |
| 5,153,578 | 10/1992 | Izawa et al. | 370/60.1 |
| 5,228,032 | 7/1993 | Mertelmeier | 370/60 |

FOREIGN PATENT DOCUMENTS 4023992 6/1991 Germany.

OTHER PUBLICATIONS

Electronics and Communication Engineering Journal, vol. 4, No. 4, Aug. 1992, London GB, pp. 243–251; XP000309441, T. Migotti & A1, "Performance evaluation of broadband connections and services under varying traffic loads".

NTZ Nachrichtentechnische Zeitschrift, vol. 46, No. 2, Feb. 1993, Berlin De pp. 102–108. XP298898, W. Andexser & AL. "ATM Messtechnik fur das Breitband–ISDN".

Primary Examiner—Douglas W. Olms
Assistant Examiner—Ajit Patel
Attorney, Agent, or Firm—Ware, Fressola, Van der Sluys & Adolphson

[57] ABSTRACT

A traffic generator (TFG) is provided for generating a packet information stream (OUT) with predetermined characteristics based on individual characteristics of a plurality of traffic sources (S0–255, G240–241). Such a traffic generator is used in an Asynchronous Transfer Mode or ATM networks and thus plays an important role in the emergence of such networks. The traffic generator includes a generation memory (GT) for storing a series of individual data (Group A–E) related to traffic sources (S0–255, G240–241), and includes a generation circuit (GM) for cyclically reading a series of individual source related data. Each of the individual source related data (Group A–E) relates to at least one of the traffic sources (S0–255, G240–241) as well as to generation decision data (GD, GEOT) associated thereto. Based on its associated generation decision data (GD, GEOT), the generation circuit (GM) determines whether a packet is to be generated for the at least one traffic source (S0–255, G240–241) or not, and generates an idle packet if no packet is to be generated for the at least one traffic source (S0–255, G240–241). The generation decision data (GD, GEOT) eliminates the need to run a complicated and time-consuming algorithm for calculating a new series of individual source related data every time the actual bit rate of one of the sources is updated.

14 Claims, 1 Drawing Sheet

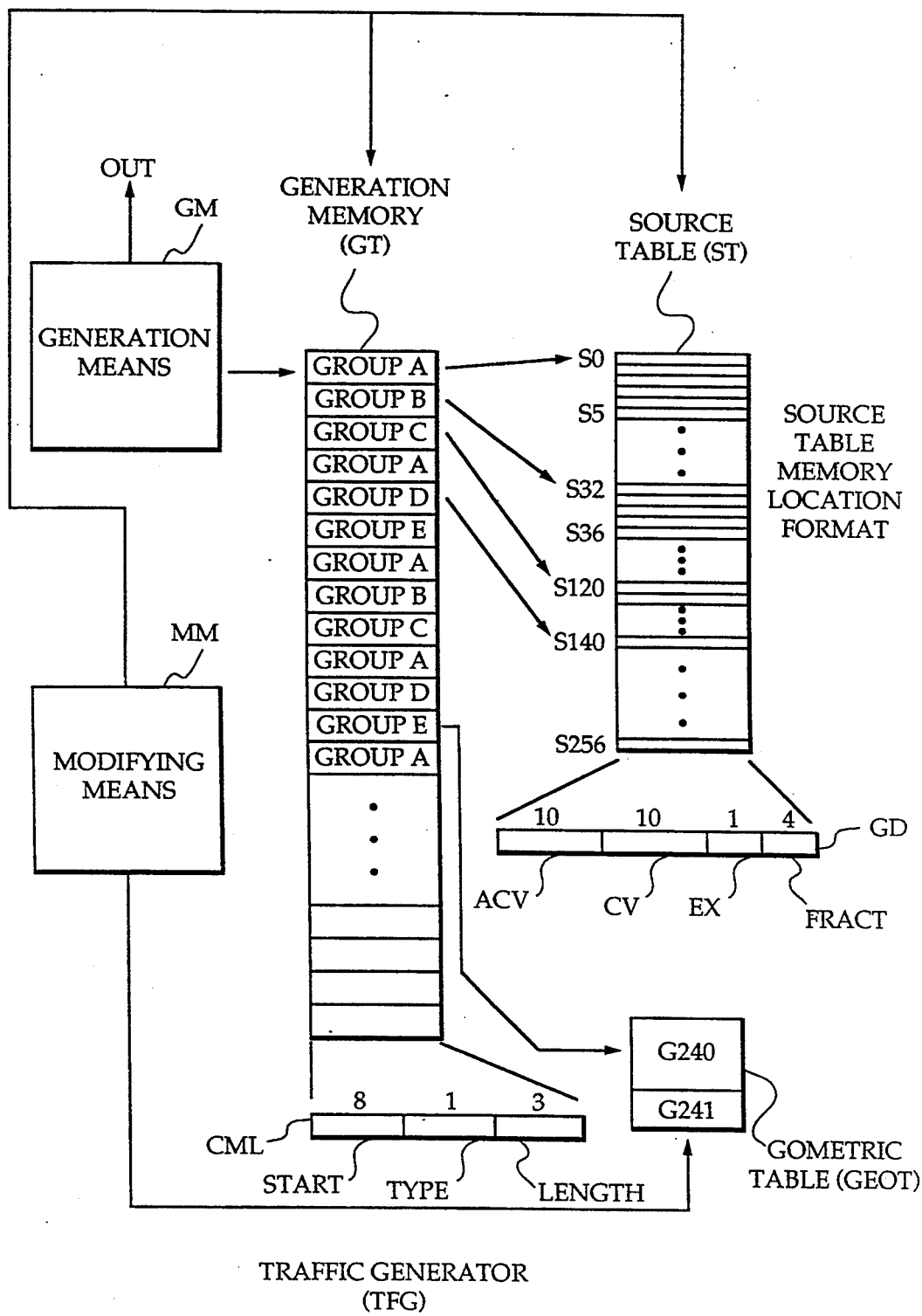

TRAFFIC GENERATOR

The present invention relates to a traffic generator for generating a packet information stream comprising information packets of a plurality of traffic sources, said generator including a generation memory storing a series of individual data related to said sources, and a generation means to cyclically read said series of individual source related data and to generate a packet for each individual source related data read.

BACKGROUND OF THE INVENTION

Such a traffic generator is an essential test tool for devices which are to be used in Asynchronous Transfer Mode or ATM networks and thus plays an important role in the emergence of such networks. To realize this goal, the packet information stream generated needs to have predetermined characteristics based on individual characteristics of the traffic sources, such as their mean and peak bit rates.

This necessitates the calculation of the actual characteristics of the traffic sources, i.e. their actual bit rates, from their mentioned individual characteristics as well as the selection of the source for which a packet has actually to be generated. This computation is slow compared to the transmission rates in ATM networks, even if state of the art technology is used, and has therefore to be done off-line.

In a possible traffic generator each individual source related data relates either to exactly one source or to none of the sources, and the mentioned generation means generates, upon reading the latter data, a packet for this source or an idle packet respectively. This memory is initialized beforehand according to the individual characteristics of the traffic sources.

In order to realize a long non-repetitive information stream without having to provide an unfeasibly large amount of memory, modifying means have to be provided for performing a periodic off-line computation to update the actual bit rates of the traffic sources according to their characteristics and to modify the individual source related data accordingly.

A drawback of the above described traffic generator is that the latter off-line computation has to take all new actual bit rates into account simultaneously so as to define a new series of individual source related data. Indeed, any update of the generation memory for one source requires that some individual source related data need to be reallocated, so inevitably affecting sources to which these individual data were previously allocated.

Such a computation is complicated and therefore also time-consuming, especially when the traffic generator needs to generate information packets for a large number of traffic sources. This results in relatively long delays in updating the generation memory and hence in a relatively long repetition, for a given storage capability of the generation memory, of the sub-optimal solution arrived at by the above computation. This generator therefore is both complicated and restricted in accuracy.

SUMMARY OF THE INVENTION

An object of the present invention is therefore to provide a traffic generator of the above known type but which is less complicated and more accurate.

This object is achieved due to the fact that each of said individual source related data relates to at least one of said sources as well as to generation decision data associated thereto, and that, based on said associated generation decision data, said generation means determines whether a packet is to be generated for said at least one source or not, and generates an idle packet if for none of said related sources a packet is to be generated.

In so doing, a packet for a specific source is not necessarily generated every time individual source related data concerning this source is read. Indeed, the associated generation data provide a refinement of the real-time packet generation process in providing means for a simple test as to whether a packet for this source needs to be actually generated or not.

An important feature of the present invention is that said generator also includes modifying means for initializing said generation memory and for adapting said generation decision data in accordance with predetermined characteristics of said packet information stream.

The modifying means can, thanks to the above, adapt the actual bit rate of the specific source by updating only its associated generation decision data leaving the series of individual source related data intact. Thus, the actual bit rate of a source can be updated independently from the other sources, thereby eliminating the need for the complicated and time-consuming computation of a total update of the generation memory. This further yields the advantages that updates for each of the sources can be made more frequently thanks to a decrease in computation time and that the unwanted repetition of the same pattern can be dramatically reduced since the updates relating to distinct sources can be made independently from each other.

The modifying means then only has to perform the complicated step of computing a series of individual source related data only when initializing the generation memory.

A characteristic feature of the present invention is that said generation memory is read at a predetermined packet generation rate and that the number of individual source related data related to one of said sources enables a predetermined bit rate for said one source, and that said generation decision data associated with said one source includes a count value, said generation means authorizing a packet to be generated for said one source if said count value equals the number of times individual source related data related to said one source is read since a previous authorization for said one source.

The above definition of the generation data allows for the actual bit rate of each source to equals its initial predetermined bit rate divided by any count value, i.e. any natural number. Such actual bit rates are obtained in a very simple way which can be easily accommodated in the real-time generation process of the generation means and memory.

A greater accuracy, i.e. more actual bit rates for a given predetermined bit rate, is obtained through the following feature of the present invention which consists in that said generation data also includes a fractional value and that said authorization is given when said number of times is reached or at the previous time individual source related data related to said one source is read dependent upon the comparison of a random number with said fractional value.

It can be easily verified that the above discrete number of actual bit rates can in this way be extended with an almost continuous number of bit rates in between the bit rates already available thanks to the previous feature, the steps between the newly available bit rates being dependent upon the number of bits of the fractional value.

It is to be noted that in the above way a specific bit rate is generated by interpolating between two bit rates of the above defined discrete number of bit rates respectively smaller and larger than the specific bit rate. This also means that, whilst the mean bit rate of a source can be made equal to the required specific bit rate, the inter-arrival time of consecutive packets cannot equal the inter-arrival time of the specific bit rate.

An important feature of the present invention allowing a better approximation of the inter-arrival times, is that said generation pace is larger than the packet transmission rate of said packet information stream, that a packet for said one source is generated for each said given authorization, and that said generated packets are queued in a buffer before being forwarded to said packet information stream.

The above feature is based on the insight that in providing for a specific source a predetermined bit rate larger than the required peak bit rate for this source better approximations can be obtained. Indeed, more useful bit rates can be obtained by dividing such a predetermined bit rate and hence also can the inter-arrival times be better approximated, since only inter-arrival times corresponding to such bit rates divided from the predetermined bit rate are available.

If, however, the above is done whilst reading the generation memory at a rate equalling the packet transmission rate, a lot of bandwidth on the output link may be wasted so diminishing the generator capacity. Therefore, the above feature further specifies that the rate at which this memory is read, which is in this case also the rate at which packets are generated, is faster than the packet transmission rate. In so doing the advantages of increasing the predetermined bit rate for a source can clearly be obtained without wasting bandwidth.

It is to be noted that the fact that the packet generation rate is larger than the packet transmission rate does not lead to a conflict since the above feature results in the generation of a large number of idle packets which, in case of conflict, do not have to be applied to the buffer or to the output link.

Another important feature of the present invention, giving an alternative way of better approximating the inter-arrival times, is that said generation pace equals the packet transmission rate of said packet information stream, and that at least one of said individual source related data is related to a plurality of said sources and that said generator also includes arbitration means for deciding which of said authorizations a packet is effectively generated.

The above feature applies the same concept of improving the accuracy of the traffic generator by increasing the predetermined bit rate but uses another way of avoiding a waste in bandwidth. This alternative consists in reading the generation memory at a rate equal to the packet transmission rate whilst each memory location is no longer allocated to one source but to a group or plurality of sources which are all scanned within the time slot needed to transmit one packet. In this way each source can again be scanned more frequently than dictated by its required peak bit rate without wasting bandwidth.

The difference with the previous feature is mainly constituted by the fact that the packet generation pace is equal to the transmission rate so that no buffer has to be provided. In fact the operation of the buffer is performed now by the arbitration means with the added advantage that the inter-arrival times of the packets for each source are more deterministic and that the accuracy of the generator can therefore be estimated beforehand.

Yet another feature of the present invention is that said generation data for each of said plurality of sources also includes an expected flag which is set when said arbitration means does not service an authorization for the associated source, that said generation means also authorizes a packet to be generated for said associated source if its expected flag is set, and that said arbitration means decides that a packet is to be generated for the first source of said group for which said authorization is given.

In this way a simple arbitration means using the generation data is obtained.

A characteristic feature of the present invention is that at least one of said individual source related data is related to a plurality of geometric sources, and that said at least one individual source related data points to a geometric table with a plurality of geometric memory locations each of which identifies one of said geometric sources and that said generation means generates a packet for the source identified in a randomly chosen geometric memory location.

As is already known in the art, some sources can be approximated by allocating a number of locations to them in a geometric table according to their required bit rate and by randomly selecting a location from this geometric table.

The above feature uses the flexibility of the present invention to simultaneously allow pluralities of geometric sources and of variable bit rate sources.

BRIEF DESCRIPTION OF THE DRAWINGS

The above-mentioned and other objects and features of the invention will become more apparent and the invention itself will be best understood by referring to the following description of an embodiment taken in conjunction with the accompanying drawing which shows part of a traffic generator TFG according to the present invention.

BEST MODE FOR CARRYING OUT THE INVENTION

This traffic generator TFG applies on an output link OUT a like named packet information stream OUT which comprises information packets such as used in Asynchronous Transfer Mode or ATM networks. The packet information stream OUT has predetermined characteristics related to a plurality of traffic sources each having individual characteristics. The latter will be described later but typically include the mean and peak bit rates of the associated traffic source. The purpose of the traffic generator TFG then is to generate as accurately as possible the information stream OUT from given individual traffic source characteristics.

More particularly, the present traffic generator TFG generates a packet information stream OUT with a transmission rate of 150 Mbit/s and consisting of packets of up to 256 traffic sources. The latter sources can be of the following general types: constant bit rate CBR, variable bit rate VBR or so called geometric GEO, the probability of packet generation being substantially constant in time in the latter case.

As depicted in the drawing, the traffic generator TFG includes for generating the mentioned information stream, a generation means GM, a generation memory GT storing a series of individual source related data Group A–E, a source table ST storing generation decision data S0–S255 associated to respective ones of the traffic sources, and a geometric table GEOT with memory locations identifying one of the geometric traffic sources.

The generation memory GT has 8K memory locations with the format as indicated in the drawing by reference CML, i.e. each memory location of GT contains individual source related data specifying a start address START, a type identifier TYPE indicating to which type of source, CBR/VBR or GEO, the individual data is related and a length indicator LENGTH indicating the number of sources related to this individual data. In this way a number of distinct source related data can be defined, hereafter called groups, each of the Groups A–E shown in the drawing being characterized by distinct definitions of CML.

The source table ST contains 256 memory locations S0–S255 with the format as indicated in the drawing by reference GD, i.e. each memory location of ST contains generation decision data associated with one of the sources and containing an actual count value ACV, a count value CV, an expected flag EX and a fractional value FRACT. Finally, the geometric table GEOT has 4K memory locations each of which includes an identifier of one of the geometric sources. In the present case two thirds of the latter memory locations are allocated to source G240 whilst the remaining locations are allocated to G241.

With reference to the above and to the drawing, the generation of the packet information stream OUT is realized in the way described hereafter.

The generation means GM, capable of generating ATM packets of any one of the 256 sources, cyclically reads the memory locations of the generation table GT under the control of a modulo counter (not shown) which counts from 1 to the total number of memory locations in the generation table GT at a packet generation rate equal to the allowed transmission rate on the output link, i.e. 150 Mbit/s, divided by the number of bits in an ATM packet, i.e. 53 times 8. Each time GM reads a memory location of GT, it carries out the following sequence of actions.

The generation means GM first processes the type bit TYPE in the following way:

—If TYPE is 0 the source related data read relates to the group of geometric sources Group E, i.e. all sources which are identified in one of the memory locations of GEOT, and the generation means GM selects a random natural number from 1 to 4096. It then reads the memory location of GEOT corresponding to the latter number and generates a packet for the traffic source to which the latter memory location was allocated, i.e. either G240 or G241.

—If TYPE is 1 the source related data relates to a group of CBR or VBR sources Group A–D and the generation means GM will read a number of consecutive memory locations of the source table ST equal to LENGTH, starting with the memory location indicated by the start address START. As indicated in the drawing such groups can relate to a single CBR source S140 as is the case with Group D or to pluralities of VBR sources S1–6, S32–35 and S120–121 as is the case with Groups A–C. For each of the latter groups the read operation in the source table ST provides the generation decision data of one of the sources according to the format GD. The latter data is then handled for one such groups, as described in the following algorithm. The latter algorithm is for clarity's sake listed hereafter using conventional programming code and is run after having read the field LENGTH and START of one of the locations of GT:

```
SENT:=FALSE;
while LENGTH <> 0
        ACV, CV, EX, FRACT:=READ ST(START)
        ACV:=ACV-1;
        if EX=TRUE and NOT SENT
                Generate packet S(START);
                SENT:=TRUE;
                EX:=FALSE
        endif
        if ACV=0 or (ACV-1=0 and FRACT < RAND)
                ACV:=CV;
                if NOT SENT
                        Generate packet S(START);
                        SENT:=TRUE;
                else
                        EX=TRUE;
                endif
        endif
        ST(START):=write(ACV, CV, EX, FRACT);
        START=START+1;
        LENGTH=LENGTH-1;
endwhile
```

With state of the art technology and in view of the packet transmission rate of the information stream OUT, the algorithm can be run 6 times, i.e. each group is constituted by at most 6 different traffic sources.

With reference to the above algorithm, it can be clearly seen that the generation means performs arbitration in case a plurality of sources of the same group require packet generation. Indeed, this arbitration is performed via the logical variables SENT and EX and consists in generating a packet for the first source in a group requiring packet generation whilst any further sources requiring packet generation are handled by setting their expected flag EX and by also authorizing packet generation if the expected flag EX of a source is set.

It can be verified that if the bit rate allocated to the group is larger than or equal to the sum of the required peak bit rates of the sources in the group, each packet generation authorization results in packet generation through the mechanism of the expected flag EX.

From the above algorithm, it further follows that an authorization for packet generation for a source S(START) is basically given, 1. if the number of times this algorithm is run for S(START) since a previous authorization for S(START) equals the count value CV. The predetermined bit rate of S(START) corresponding to the number of memory locations allocated to its corresponding group in the generation table GT can be divided by CV.

2. in a previous run of the algorithm for S(START) if a random number is larger than the fractional value FRACT. In this way, FRACT can be used to interpolate between e.g. a bit rate equal to the mentioned predetermined bit rate divided by 10 and a bit rate equal to this predetermined bit rate divided by 9 in order to achieve a mean actual bit rate between the two latter bit rates. In the present generator, 4 bits are reserved for FRACT so that between every two bit rates obtained by dividing the predetermined bit rate 16 interpolated mean bit rates can be achieved.

It is to be noted that the above general algorithm can also be used to generate packets for CBR sources e.g. S140. For each such CBR source a single group is established, hence LENGTH equals 1, whilst the count value CV for such a source is set at 1 in such a way that every time individual source related data related to this CBR source is read, a packet for this source is generated.

Secondly, the handling of the geometric Group E will be discussed. Memory locations of the geometric table GEOT are allocated to the geometric sources G240 and G241 in view of the mean bit rate required by these geometric sources. In the present example source G240 has a mean bit rate two times that of G241 and therefore two thirds of the memory locations of GEOT are allocated to G240 and the remainder to G241. In so doing, it can be clearly seen that each time Group E is designated in the generation table GT, the packet generation probability for each of the geometric sources is constant. It is to be noted that this deviates from the theoretical geometric model in that the packet generation probability is zero in time slots dedicated to other groups than the geometric Group E, but that this deviation is only slight and can be controlled by increasing or decreasing the number of individual source related data of GT related to the geometric group Group E in accordance with the total bit rate of the geometric sources.

Before the generation table GT, source table ST and the geometric table GEOT can be used by the generation means GM, the content of these tables has to be initialized according to the predetermined characteristics. Also, for allowing VBR sources, it is necessary that the content of the above memory tables can be updated in such a way that a new actual bit rate for these VBR sources can from time to time be established. Both functions are in the present generator performed off-line by a modifying means (MM) whose operation will be described below with reference to a specific example.

In this example 6 sources with the following predetermined characteristics need to be represented in the tables GT, ST and GEOT:

| Source 1: | CBR | 37.5 Mbit/s |
|---|---|---|
| Source 2: | GEO | MEAN = 5 Mbit/s |
| Source 3: | GEO | MEAN = 17 Mbit/s |
| Source 4: | GEO | MEAN = 12 Mbit/s |
| Source 5: | VBR | PEAK = 15 Mbit/s |
| | | ACTUAL = 3 Mbit/s |
| Source 6: | VBR | PEAK = 20 Mbit/s |
| | | ACTUAL = 19 Mbit/s |

Firstly, groups of sources are formed which in the present example simply consist each of all sources of a specific type, hence the following groups need to be considered:

| Group A: | Source 1 |
|---|---|
| Group B: | Source 2, 3, 4 |
| Group C: | Source 5, 6 |

It is to be noted that if the number of VBR sources is larger than 6, these VBR sources need to be allocated to different groups. This can be easily achieved from the present description by a person skilled in the art.

Secondly, to each of these groups a predetermined bit rate needs to be allocated, these bit rates correspond to the number of memory locations of the generation table GT allocated to these groups. Indeed, all memory locations of GT correspond to 150 Mbit/s so that every third memory location of GT needs to be allocated a group with a predetermined bit rate of 50 Mbit/s. In the present example this yields the following predetermined bit rates.

| Group A: | 37.5 Mbit/s |
|---|---|
| Group B: | 37.5 Mbit/s |
| Group C: | 75 Mbit/s |

It is clear that the predetermined bit rate of a group needs to be at least equal to the sum of the peak bit rates of the sources in this group. For group C the predetermined bit rate is chosen much larger than this sum in order to better-approximate all needed actual bit rates whereas such is not needed for Groups A and B.

Indeed, since these actual bit rates can be established via the above described mechanism of division and interpolation, it can be clearly seen that in providing a predetermined bit rate for VBR groups that is as large as possible, the best approximation can be obtained. In such a VBR group each source thus benefits from the fact that the predetermined bit rate for the group may be higher than the peak bit rate of each constituent source without wasting bandwidth in the traffic generator TFG. For instance the actual bit rate of Source 6, 19 Mbit/sec, can now be approximated by dividing 75 Mbit/s which clearly allows a better approximation than when it had to be approximated by dividing from 20 Mbit/s.

The generation table GT for the above predetermined bit rates has then to be filled in, according to the above predetermined bit rates for each of the groups A–C with the following sequence: A C B C A C B C A C . . . .

Finally for each VBR or CBR source and for the geometric group B, the source table ST and the geometric table GEOT respectively need to be further defined.

This yields the following for the source table ST:

| ST(1): | CV = 1 | FRACT = 0 |
|---|---|---|
| ST(5): | CV = 25 | FRACT = 0 |
| ST(6): | CV = 4 | FRACT = 1 |

From the above it can be seen that VBR source 5 can be exactly generated thanks to the fact that its actual bit rate can be obtained by dividing the predetermined bit rate of its corresponding group whereas VBR source 6 has to be approximated by using the fractional value. For the latter source a FRACT of one ensures that in sixteen authorizations for this source, a packet is generated once corresponding to a bit rate of 25 Mbit/s whereas the other authorizations correspond to a bit rate of 18.75 Mbit/s, so yielding an interpolated actual bit rate of 19.1 Mbit/s.

The geometric table GEOT has to be defined according to the mean bit rates of the respective geometric sources in the following way:

| Source 2: | 546 memory locations |
|---|---|
| Source 3: | 1857 memory locations |
| Source 4: | 1310 memory locations |
| IDLE: | 383 memory locations |

Wherein for memory locations allocated to IDLE, idle packets will be generated by the generation means GM.

In the above way only the initialization of the different tables in the traffic generator TFG is dealt with. Indeed, for a VBR source the actual bit rate must be allowed to be updated. This is done by the same modifying means and can advantageously be achieved by only recalculating the generation data GD associated to each such VBR source without changing the sequence in which the memory locations of GT are allocated to the different groups.

For instance, if the actual bit rate of source 6 needs to be updated to 15 Mbit/s this can be simply done by changing its count value CV to 5 and its fractional value FRACT to 0.

Thus it emerges that the modifying means may for each source calculate updated generation data GD considering only the individual characteristics of this particular source. The modifying means performs such a calculation for each source consecutively so that if this calculation for one source is typically 5 times slower than the packet generation pace, every 5 time slots the source table ST will be updated and the output sequence of the traffic generator TFG changed.

Finally, one such calculation will be described in some detail with respect to the predetermined characteristics of the corresponding source. These characteristics for VBR sources normally are under the form of an N-state model, wherein each state is characterized by a mean stay time, a maximal stay time, a mean bit rate, a maximal bit rate, and transition probabilities to the other states.

A calculation then is performed when the time since a previous state transition exceeds the stay time which was calculated when entering the actual state based on the stay time characteristics of this state. This calculation then consists in firstly determining the next state based on the transition probabilities. Secondly, a stay time for this next state is calculated based on the stay time characteristics of the latter state. And finally, a new actual bit rate is calculated from the bit rate characteristics of the next state.

This N-state model can for instance be used to simulate a VBR digital video stream in which only one state corresponding to one frame time is considered. The stay time then always equals this frame time, i.e. typically 40 ms, and the actual bit rate can be determined from a suitable bit rate distribution characteristic of the video traffic.

The implementation of the newly calculated actual bit rate can then be done as described above by adapting the generation data GD of the source under consideration.

While the principles of the invention have been described above in connection with specific apparatus, it is to be clearly understood that this description is made only by way of example and not as a limitation on the scope of the invention.

We claim:

1. A traffic generator (TFG) generating a packet information stream (OUT) comprising information packets of a plurality of traffic sources (S0–255, G240–241), said generator including a generation memory (GT) for storing a series of individual source related data (Group A–E), and a generation means (GM) to cyclically read said series of individual source related data (Group A–E) and to generate a packet for each individual source related data (Group A–E) read, characterized in that the generation memory (GT) relates each of said individual source related data (Group A–E) to at least one of said plurality of traffic sources (S0–255, G240–241) as well as to generation decision data (GD, GEOT) associated thereto, and based on said generation decision data (GD, GEOT), said generation means (GM) determines whether a packet is to be generated for said at least one traffic source (S0–255, G240–241) or not, and generates an idle packet if no packet is to be generated for said at least one traffic source (S0–255, G240–241).

2. A Traffic generator (TFG) according to claim 1, characterized in that said generator (TFG) also includes modifying means for initializing said generation memory (GT) and for adapting said generation decision data (GD, GEOT) in accordance with predetermined characteristics of said packet information stream (OUT).

3. A traffic generator (TFG) according to claim 1, characterized in that said generation memory (GT) is read at a predetermined packet generation rate and that the number of individual source related data (Group A–D) related to one of said sources (S0–255) determines a predetermined bit rate for said one source (S0–255), and said generation decision data (GD) associated to said one source (S0–255) includes a count value (CV), said generation means (GT) authorizing a packet to be generated for said one source (S0–255) when if said count value (CV) equals the number of times the individual source related data associated with said one source (S0–255) is read since a previous authorization for said one source (S0–255).

4. A Traffic generator (TFG) according to claim 3, characterized in that said generation data (GD) also includes a fractional value (FRACT) and that said authorization is given when said number of times (CV) is reached or at the previous time individual source related data related to said one source is read dependent upon the comparison of a random number with said fractional value.

5. A Traffic generator (TFG) according to claim 4, characterized in that said generation rate is greater than the packet transmission rate of said packet information stream (OUT), that a packet for said one source is generated for each said given authorization, and that said generated packets are queued in a buffer before being forwarded to said packet information stream.

6. A traffic generator (TFG) according to claim 4, characterized in that said generation rate equals the packet transmission rate of said packet information stream (OUT), and that at least one of said individual source related data (Group A–C) is related to a plurality of said sources (S1–6, S32–36, S120–121); and said generation means (GM) decides for which of said authorizations a packet is effectively generated.

7. A Traffic generator (TFG) according to claim 6, characterized in that said at least one individual source related data points to a plurality of locations of a source table (ST), each of the latter locations being associated to one of said sources and including said associated generation data (GD).

8. A traffic generator (TFG) according to claim 7, characterized in that said generation data (GD) for each of said plurality of sources (S1-6, S32-36, S120-121) also includes an expected flag (EX) which is set for an associated source (S1-6, S32-36, S120-121); and said generation means (GM) also authorizes a packet to be generated for an associated source (S1-6, S32-36, S120-121) if an expected flag is set, and decides that a packet is to be generated for a first source (S1-6, S32-36, S120-121) of said group for which said authorization is given.

9. A traffic generator (TFG) according to claim 6, characterized in that said generation data (GD) for each of said plurality of sources (S1-6, S32-36, S120-121) also includes an expected flag (EX) which is set when said arbitration means does not service an authorization for the associated source, that said generation means (GM) also authorizes a packet to be generated for said associated source if its expected flag is set, and that said arbitration means decides that a packet is to be generated for the first source of said group for which said authorization is given.

10. A traffic generator (TFG) according to claim 3, characterized in that said generation rate is greater than the packet transmission rate of said packet information stream (OUT), that a packet for said one source is generated for each said given authorization, and that said generated packets are queued in a buffer before being forwarded to said packet information stream.

11. A traffic generator (TFG) according to claim 3, characterized in that said generation rate equals the packet transmission rate of said packet information stream (OUT), and that at least one of said individual source related data (Group A-C) is related to a plurality of said sources (S1-6, S32-36, S120-121), and that said generator (TFG) also includes arbitration means for deciding for which of said authorizations a packet is effectively generated.

12. A Traffic generator (TFG) according to claim 1, characterized in that at least one of said individual source related data is related to a plurality of geometric sources (G240-241), and that said at least one individual source related data points to a geometric table (GEOT) with a plurality of geometric memory locations each of which identifies one of said geometric sources and that said generation means (GM) generates a packet for the source identified in a randomly chosen geometric memory location.

13. A traffic generator (TFG) according to claim 12, wherein the generator means (GM) provides test traffic for a packet switching device.

14. A traffic generator (TFG) according to claim 12, wherein the generator means (GM) provides test traffic for a packet switching device.

* * * * *